(12) United States Patent
Kobayashi et al.

(10) Patent No.: US 9,188,826 B2
(45) Date of Patent: Nov. 17, 2015

(54) LIGHT-ADJUSTING ELEMENT AND PRODUCT CONTAINING THE SAME

(75) Inventors: Norihisa Kobayashi, Chiba (JP); Kazuki Nakamura, Chiba (JP); Shingo Araki, Chiba (JP)

(73) Assignee: NATIONAL UNIVERSITY CORPORATION CHIBA UNIVERSITY, Chiba-shi, Chiba (JP)

(*) Notice: Subject to any disclaimer, the term of this patent is extended or adjusted under 35 U.S.C. 154(b) by 0 days.

(21) Appl. No.: 14/001,955

(22) PCT Filed: Mar. 2, 2012

(86) PCT No.: PCT/JP2012/055415
§ 371 (c)(1),
(2), (4) Date: Apr. 3, 2014

(87) PCT Pub. No.: WO2012/118188
PCT Pub. Date: Sep. 7, 2012

(65) Prior Publication Data
US 2014/0218781 A1  Aug. 7, 2014

(30) Foreign Application Priority Data
Mar. 2, 2011 (JP) .................... 2011-045762

(51) Int. Cl.
*G02F 1/155* (2006.01)

(52) U.S. Cl.
CPC ........ *G02F 1/155* (2013.01); *G02F 2001/1552* (2013.01)

(58) Field of Classification Search
CPC .................... G02F 1/155; G02F 2001/1552
See application file for complete search history.

(56) References Cited

FOREIGN PATENT DOCUMENTS

JP  2007-052236 A  3/2007
JP  2010-175877 A  8/2010

OTHER PUBLICATIONS

NPL English-Language Translation of International Preliminary Report on Patentability (IB/373) prepared for PCT/JP2012/055415 on Sep. 3, 2013.*
International Search Report for PCT/JP2012/055415 (2 pgs.).
(Continued)

*Primary Examiner* — David N Spector
(74) *Attorney, Agent, or Firm* — Flynn, Thiel, Boutell & Tanis, P.C.

(57) ABSTRACT

Provided are a light-adjusting element and a product containing the same. The light-adjusting element usable even with a transmission display device, and has a high-quality mirror state capable of a high contrast ratio. A light-adjusting element, according to one embodiment of the present invention, is characterized by including: a pair of substrates; a pair of electrodes formed on opposing surfaces of the pair of substrates, with one electrode being a transparent electrode that has nanometer-scale depressions and protrusions; and en electrolyte layer, interposed between the pair of electrodes, which has electrolyte as well as a mediator and an electrochromic material that has silver. Furthermore, a device according to one embodiment of the present invention at least partially includes the light-adjusting element.

8 Claims, 12 Drawing Sheets (56) References Cited

OTHER PUBLICATIONS

"Fabrication and properties of novel silver deposition-based electrochromic cell which shows clear transparent, silver-mirror and black color states", by K. Kobayashi et al, The Imaging Society of Japan, Dai 108 Kai Kenkyu Toronkai, Imaging Conference Japan 2011 Fall Meeting Yokoshu, Dec. 2, 2011, pp. 81-84.

"Coloring and bleaching properties of silver precipitate based EC cell with nickel oxide counter electrode", by Shingo Araki et al, 2010, Abstracts of Autumn Meeting of the Electrochemical Society of Japan, Sep. 2, 2010, p. 46.

* cited by examiner

LIGHT-ADJUSTING ELEMENT AND PRODUCT CONTAINING THE SAME

TECHNICAL FIELD

The present invention relates to a light-adjusting element and a product containing the light-adjusting element. More specifically, the present invention relates to a light-adjusting element and a product using the light-adjusting element such as a display device, a light-adjusting filter that adjusts amount of light irradiated from outside, an anti-glare mirror, and the like, in which light can be adjusted by including electrochromic material to vary light property thereof.

BACKGROUND ART

An element that adjusts amount of light transmission for a display device, a light-adjusting filter, and the like, is sold in a market.

A device for displaying information (a display device) such as a television, a monitor for a personal computer, and a display for mobile phone is one of essential devices in recent information society. A light-adjusting filter that adjusts amount of light irradiated from outside, an anti-glare mirror, and the like have similar effect to a curtain being capable of adjusting light irradiated from outside in a space of house, car, airplane, etc. Thus, they are very useful in life.

A display type of a display device can be generally divided into a reflection type, a transmission type, and a light emission type. A person who manufactures a display device generally selects a preferable display type for manufacturing a display device by assuming an environment of usage for a display device.

Recently, portability of a display device has been enhanced by miniaturizing and thinning a display device, so that a display device has been often used in an environment of different brightness levels and demands of users for a display device have been also diversified. As a mode for a display device, for example, a mirror surface state of a display screen as well as a bright state and a dark state has been demanded. This is the same as a light-adjusting filter, and the like.

As a related technology, for example, an electrochromic mirror in which a mirror layer is formed on one substrate of a pair of substrates is disclosed in a patent document 1 described below.

RELATED ART REFERENCE

Patent Reference

Patent document 1: Japanese Unexamined Patent Application Publication No. 10-500225

DESCRIPTION OF THE INVENTION

Problems to be Solved by the Invention

However, there is a problem about a display device disclosed in the patent document 1 that a mirror layer is fixed, a mirror surface of an electrochromic display element is merely changed, usage of a display device is not considered, and even if considered, usage of display device is limited to only a reflection type.

Thus, in consideration of the above-described problem, it is an object of the present invention to provide a light-adjusting element and a product containing the light-adjusting element that can be used for transmission type and that has a high-quality mirror surface state for high contrast ratio.

Means for Solving the Problems

A display device of one aspect according to the present invention is characterized by comprising: a pair of substrates; a pair of electrodes formed on opposing surfaces of the pair of substrates, one electrode being a transparent electrode that has nanometer-scale depressions and protrusions; and an electrolyte layer containing electrolyte, electrochromic material that includes silver, and a mediator, with the electrolyte layer being sandwiched between electrodes.

Effects of the Invention

Therefore, in the present invention, provided are a light-adjusting element and a product containing the light-adjusting element that can be used even as transmission type and that has a high-quality mirror surface state and high contrast ratio.

BEST MODE FOR CARRYING OUT THE PRESENT INVENTION

Hereinafter, embodiments of the present invention are described with reference to the drawings. However, the present invention can be accomplished with different embodiments and is not limited to embodiments described below.

Figure 1:
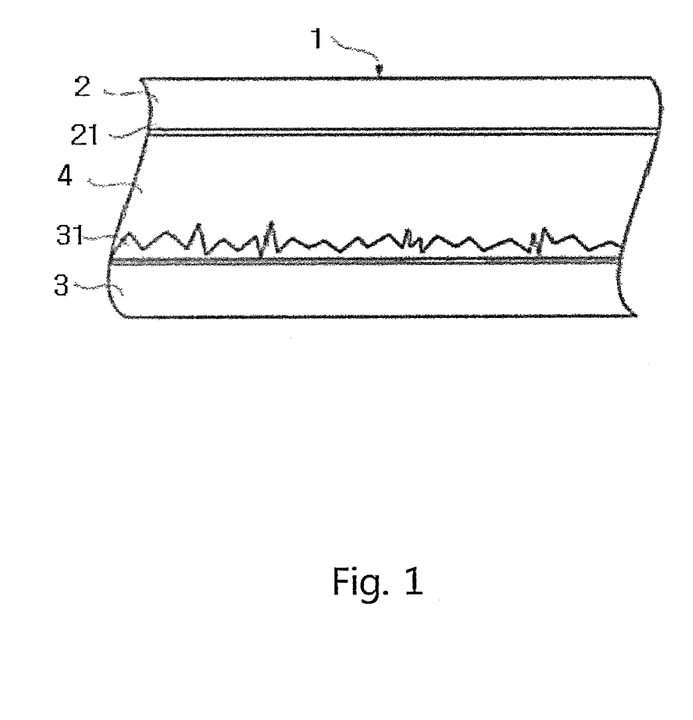
FIG. 1 is a drawing schematically showing a cross-sectional view of a display device according to one embodiment of the present invention.

FIG. 1 is a drawing schematically showing a cross-sectional view of a display device 1 (hereinafter, referred to as "the present display device") according to one embodiment that is one example of a light-adjusting element of the present invention. As shown in FIG. 1, the present display device 1 comprises a pair of substrates 2, 3, a pair of electrodes 21, 31 formed on opposing surfaces of the pair of substrates 2, 3, an electrolyte layer 4 including an electrochromic material that contains silver, and a mediator, the electrolyte layer 4 being sandwiched between the pair of electrodes 21, 31.

The pair of substrates 2, 3 according to one embodiment of the present invention is used for the electrolyte layer 4 being maintained and sandwiched therebetween. At least one of the pair of substrates 2, 3 may be transparent. When both the substrates 2, 3 are transparent, a display device for a transmission type can be realized. In the present embodiment, a case in which both the pair of substrates 2, 3 are transparent is used. Moreover, material for the substrates 2, 3 is not limited as far as the substrates 2, 3 have useful hardness and chemical stability, and maintain a material layer. Glass, plastics, metal, semiconductor, etc. may be employed. Glass or plastics may be used as a transparent substrate.

Furthermore, in the present embodiment, electrodes 21, 31 are formed on opposing surfaces (inner surfaces) of each of the pair of substrates 2, 3. The electrodes 21, 31 are used for applying a voltage to the material layer sandwiched between the pair of substrates 2, 3. As material of the electrodes 21, 31, it is not limited as far as electric conductivity is preferably maintained. Not specifically defined, when substrate is transparent, for example, electrode may be at least one of ITO, IZO, $SnO_2$, ZnO, and the like.

Moreover, in the present embodiment, one of the electrodes 21, 31 is preferably a particle-modified electrode on which relatively large depressions and protrusions are formed, the particle-modified electrode having transparency and conductivity. The other of the electrodes 21, 31 is preferably a smooth electrode. Herein, the particle-modified electrode means an electrode in which a particle is fixed to a surface thereof and relatively large depressions and protrusions having nanometer-scale order is formed thereon. Size of depressions and protrusions on the particle-modified electrode is not limited. Difference of elevation of depressions and protrusions (difference of maximum height and minimum height thereof) is preferably 50 nm or more and 500 nm or less, and more preferably 100 nm or more and 500 nm or less. For example, this can be accomplished by particles being arranged and fixed thereto, the particles of which size being preferably 50 nm or more and 500 nm or less, and being more preferably 100 nm or more and 500 nm or less. Not specifically defined, examples of material for the particles include ITO, IZO, titanium oxide, NiO, $SnO_2$, ZnO, etc. Material for the particles is preferably ITO or IZO, and more preferably ITO because conductivity is completely obtained. No depressions and protrusions are formed on the smooth electrode. Even though depressions and protrusions exist on the smooth electrode, size thereof is under nanometer-scale order. Not specifically defined, difference of elevation thereof is preferably 20 nm or less, more preferably 10 nm or less, still more preferably 5 nm or less. As material for the smooth electrode, material similar to the particle-modified electrode may be employed.

Furthermore, in the present embodiment, surface roughness (Ra) of the particle-modified electrode measured by stylus type is preferably 100 nm or more and 400 nm or less, more preferably 50 nm or more and 400 nm or less. By the surface roughness being maintained within these ranges, a dark state described later can be realized. Surface roughness of the smooth electrode is preferably under the above-mentioned ranges. The surface roughness of the smooth electrode measured by stylus type is specifically 20 nm or less, preferably 10 nm or less and more preferably 5 nm or less. By the surface roughness being maintained within these ranges, a mirror state described later can be realized.

Electrodes 21, 31 according to the present embodiment may be formed on the substrates 2, 3, the electrodes 21, 31 may be a form that matches a pattern such as a character to be displayed, and the electrodes 21, 31 may be formed to align an electrode pattern on a plurality of substrates, the electrode pattern being divided into each of a plurality of regions with same size. When the electrode pattern is divided into each of the plurality of regions, each of the plurality of regions becomes a pixel, and each of the pixels is controlled for display, thereby display being obtained with complex form.

Distance between the electrodes 21, 31 is not limited as far as silver is sufficiently deposited as a fine particle in electrochromic material described later and an electric field that disappears is applied. For example, the distance therebetween is preferably 1 μm or more and 10 mm or less, and more preferably 1 μm or more and 1 mm or less.

The electrodes 21, 31 according to the present embodiment are connected to a power supply via wirings that have their own conductivities. Applying a voltage or applying no voltage can be controlled by turning on the power supply or turning off the power supply.

An electrolyte layer 4 according to the present embodiment includes electrolyte as supporting salt, and also includes electrochromic material 41 and mediator 42, the electrochromic material 41 containing silver. Moreover, the electrolyte layer 4 according to the present embodiment also includes a solvent for maintaining the electrochromic material 41 containing silver ion, and the mediator 42.

Electrolyte in the electrolyte layer 4 according to the present embodiment facilitates oxidation-reduction reactions of the electrochromic material 41. For example, the electrolyte is preferably supporting salt, and preferably includes bromide ion. Examples thereof include LiBr, KBr, NaBr, tetrabutylammonium bromide (TBABr), etc. Not specifically defined, concentration of the electrolyte is about five times as much as that of the electrochromic material 41 by molar concentration. Specifically, concentration of the electrolyte is three to six times as much as that of the electrochromic material 41. For example, the concentration of the electrolyte preferably is 3 mM or more and 6 M or less, more preferably 5 mM or more and 5 M or less, more preferably 6 mM or more and 3 M or less, more preferably 15 mM or more and 600 mM or less, more preferably 25 mM or more and 500 mM or less, and more preferably 30 mM or more and 300 mM or less.

A solvent according to the present embodiment is not limited as far as electrochromic material 41, electrochemical light emission material and electrolyte are stably maintained. For example, the solvent is a polar solvent such as water or a non-polar organic solvent. Not specifically defined, the solvent may be DMSO.

An electrochromic material 41 according to the present embodiment causes oxidation-reduction reactions by applying direct current voltage and is preferably salt that includes silver ion. Fine silver particle is deposited or disappeared by the oxidation-reduction reactions of the electrochromic material 41, thereby generating change of color to perform a display. Not specifically defined, examples of the electrochromic material 41 containing silver include $AgNO_3$, AgClO$_4$, AgBr, etc. Concentration of the electrochromic material 41 is not limited as far as the above-mentioned function is accomplished. The concentration of the electrochromic material 41 depends on types of material and may be preferably adjusted. The concentration thereof is preferably 5 M or less, more preferably 1 mM or more and 1 M or less, and still more preferably 5 mM or more and 100 mM or less.

A mediator according to the present embodiment is material being capable of carrying out oxidation-reduction reactions in which electrochemical energy of the mediator is lower than that of silver. Color disappearing reaction due to oxidation can be assisted by oxidant of the mediator receiving electrons from silver and giving electrons to silver at all times. The mediator is not limited as far as the above-mentioned function is accomplished. For example, the mediator is preferably salt of copper (II) ion. More specifically, examples of the mediator include CuCl$_2$, CuSO$_4$, and CuBr$_2$. Concentration of the mediator is not limited as far as the above-mentioned function is accomplished. The concentration of the mediator depends on types of material and may be preferably adjusted. The concentration thereof is preferably 5 mM or more and 20 mM or less, and more preferably 15 mM or less. The concentration of 20 mM or less prevents excessive coloring. A ratio of silver ion concentration to copper (II) ion concentration is not limited. However, when silver ion concentration is 10, copper (II) ion concentration is preferably 1 or more and 3 or less.

In the present embodiment, besides the above-mentioned condition, a thickening agent may be added. Memory property of an electrochromic element can be enhanced by adding the thickening agent. Not specifically defined, example of the thickening agent is polyvinyl alcohol. Not specifically defined, concentration of the thickening agent is preferably 5 wt % or more and 20 wt % or less with respect to total amount of the electrolyte layer 4.

Figure 2:
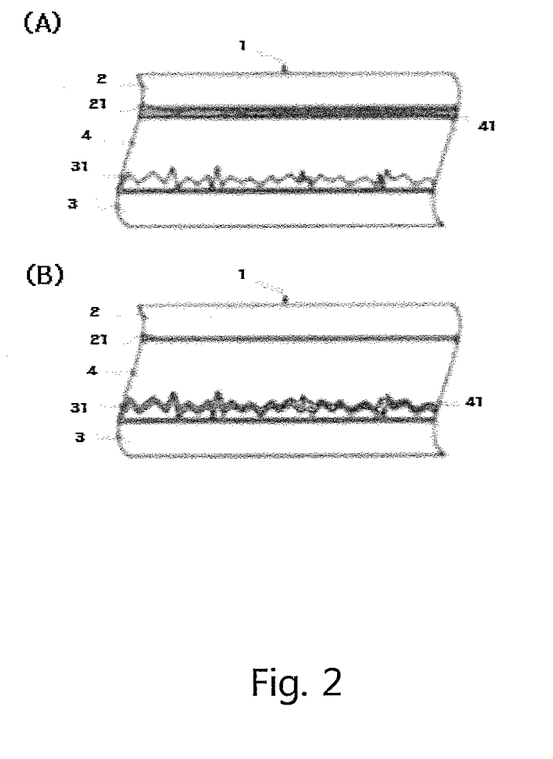
FIG. 2 is drawings describing a principle for a display device according to one embodiment of the present invention.

The present display device, for example, realizes a reflection state and a dark state with applied voltage, and a transmission state with no applied voltage. FIG. 2 is drawings schematically showing a state of an element according to the present embodiment. Moreover, FIG. 2 (A) shows a state of a mirror display and FIG. 2 (B) shows a state of a dark display.

In the present display device, when a voltage is applied between electrodes 21, 31, silver ion in electrochromic material 41 is reduced to deposit silver on one of the electrode 21, 31. Meanwhile, when no voltage is applied, silver is dissolved again as silver ion. In that case, when silver is formed on a smooth electrode, a mirror state is accomplished and when silver is formed on a particle-modified electrode, a dark state is accomplished by diffused reflection of light. In that case, for an observer, one substrate on which the smooth electrode is formed is front side, and the other substrate on which the particle-modified electrode with depressions and protrusions is back side. Voltage strength of direct current voltage applied can be adjusted by controlling distance between a pair of substrates 2, 3, i.e., a pair of electrodes 21, 31. Not specifically defined, electric field intensity is preferably $1.0 \times 10^3$ V/m or more and $1.0 \times 10^5$ V/m or less, and more preferably $1.0 \times 10^4$ V/m or less.

Hereinabove, the present embodiment provides a display device having a high-quality mirror surface state and high contrast ratio, the display device being used even as transmission type. In particular, the present embodiment includes a mediator that causes oxidant-reduction reactions, the mediator having lower energy than silver, so that excellent repetitive durability thereof is obtained. Thus, a light-adjusting element and a product having the light-adjusting element can be provided, the light-adjusting element having a high-quality mirror surface state and high contrast ratio, and the light-adjusting element being used even as transmission type.

EXAMPLES

Herein, a display device is manufactured, and then effects thereof are confirmed. The details are described below.

Figure 3:
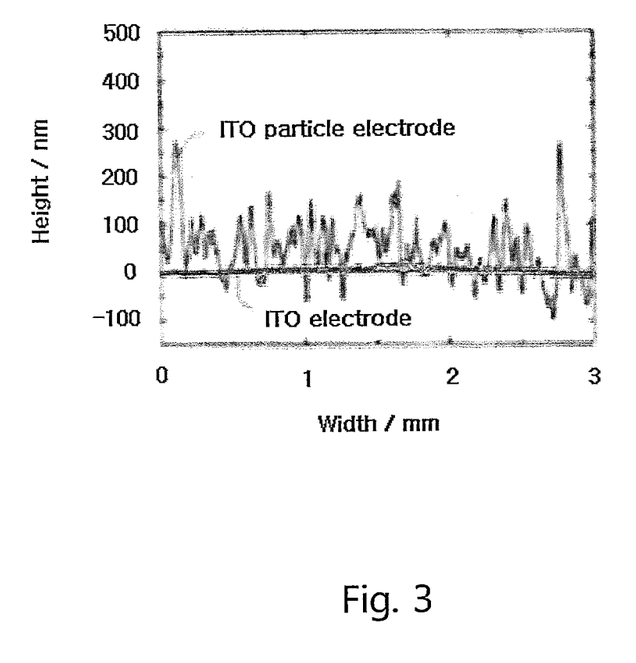
FIG. 3 is a drawing showing surface profiles of an ITO electrode and an ITO particle-modified electrode of a display device according to one example of the present invention.

Glass substrates were used for a pair of substrates, ITO electrodes were used for a pair of electrodes, AgNO$_3$ was used for electrochromic material, DMSO was used for a solvent, TBABr was used for support electrolyte (counter electrode reaction material), and CuCl$_2$ was used for a mediator. One electrode was a smooth ITO electrode (ITO electrode) and the other electrode was formed by spin-coating (500 rpm during 5 seconds and 1500 rpm during 15 seconds) of ITO particle dispersion with size of about 100 nm to 300 nm on an ITO electrode and by baking for one hour at 250° C. Concentrations of AgNO$_3$, TBABr, and a mediator were 50 mM, 250 mM, and 10 mM, respectively. An electrolyte layer was sandwiched between the pair of substrates with spacers, the distance between the pair of electrodes being 500 μm. In FIG. 3, surface profiles of ITO electrode and ITO particle-modified electrode are shown. The surface profiles were observed within a wide range of width of 3 mm.

Based on the surfaces profiles, by measuring difference of elevation for depressions and protrusions, it was confirmed that difference of maximum height and minimum height thereof was about 400 nm for the particle-modified electrode having transparency and conductivity. Meanwhile, it was confirmed that depressions and protrusions were almost not found, and difference of maximum height and minimum height thereof was about 20 nm or less.

Based on the surface profiles, when surface roughness was measured by stylus type, surface roughness of the particle-modified electrode was 189 nm and that of the smooth electrode was 1 nm. As a result, depressions and protrusions with nanometer-scale order were formed for the particle-modified electrode. Meanwhile, depressions and protrusions with under nanometer-scale order were formed for the smooth electrode. Therefore, the particle-modified electrode and the smooth electrode were very different in surface roughness.

Figure 4:
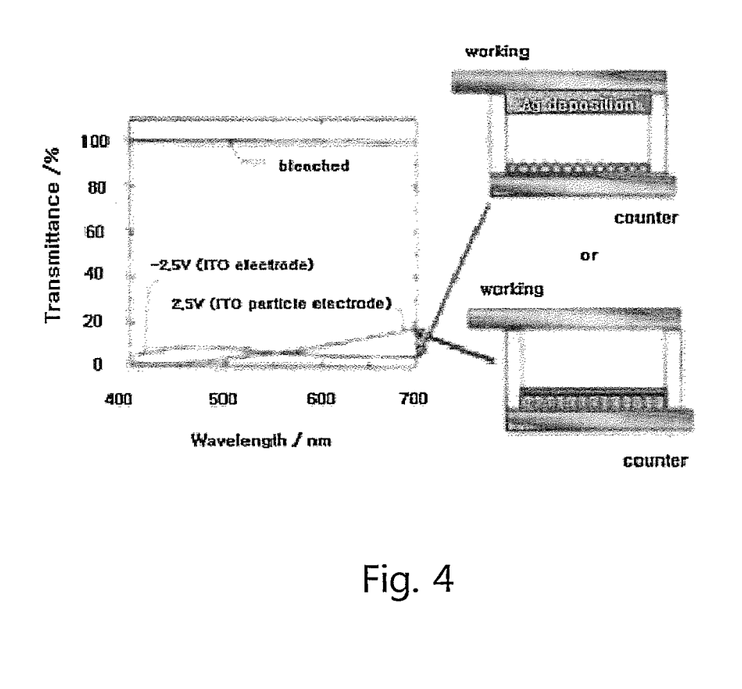
FIG. 4 is a drawing showing transmission spectrum measurements for a display device according to one example of the present invention.

Moreover, transmission spectra were measured when voltages of +2.5 V to −2.5V were applied between electrodes. In FIG. 4, those results were shown. In any of +2.5 V and −2.5 V, it was confirmed that light was sufficiently blocked. It was also confirmed that light was sufficiently transmitted when color disappeared.

Figure 5:
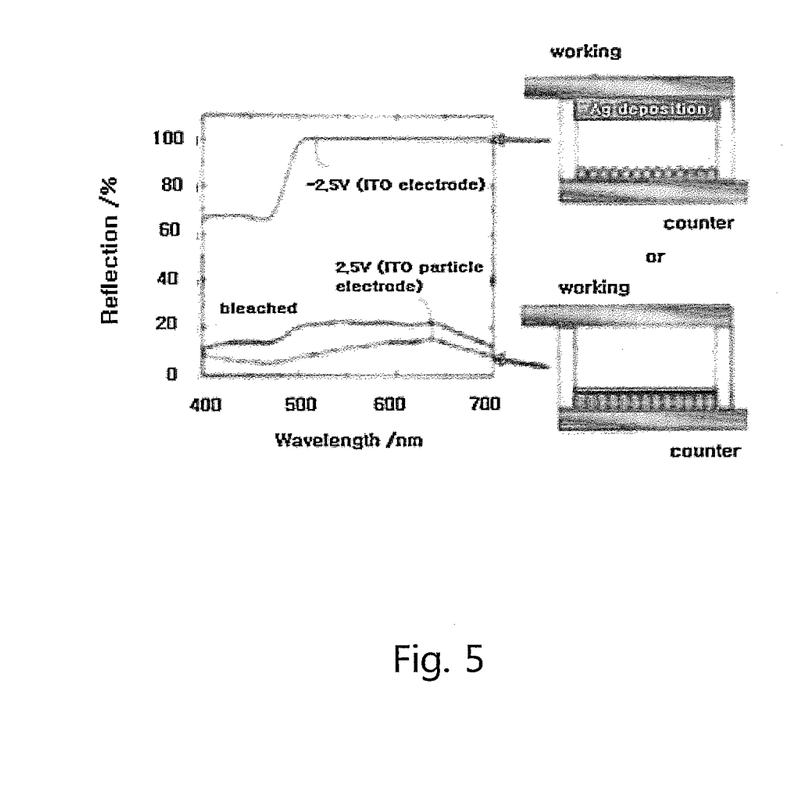
FIG. 5 is a drawing showing reflection spectrum measurements for a display device according to one example of the present invention.
Figure 6:
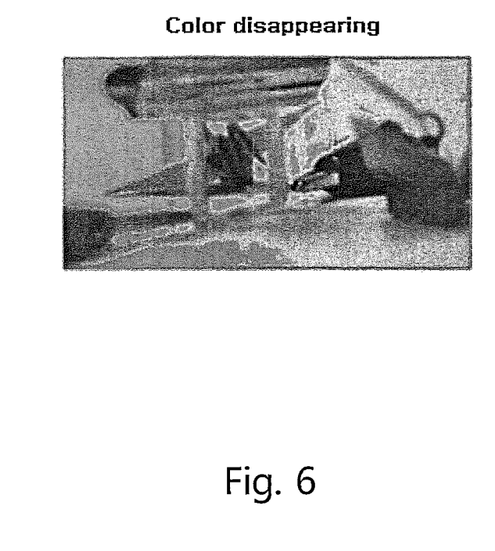
FIG. 6 is a photographic drawing of a transmission state of a display device according to one example of the present invention.
Figure 7:
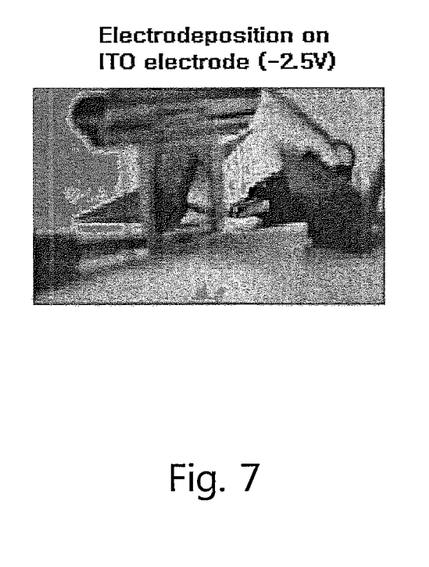
FIG. 7 is a photographic drawing of a mirror state of a display device according to one example of the present invention.
Figure 8:
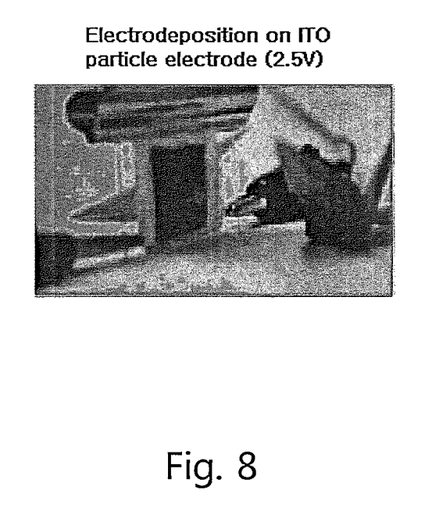
FIG. 8 is a photographic drawing of a dark state of a display device according to one example of the present invention.

Moreover, reflection spectra were measured when the above-mentioned voltages were applied. In FIG. 5, those results were shown. In −2.5 V, sufficient reflection property is obtained. Meanwhile, in +2.5 V, very low reflectivity was shown, so that a dark state was confirmed. That is, from the above-mentioned results, a reflection state, i.e., a mirror state was realized in −2.5 V, a dark state was realized in +2.5 V, and a light transmission state was realized when color disappeared. Photographic drawings for each of the states are shown in FIGS. 6, 7, and 8. FIGS. 6, 7 and 8 are photographic drawings at color disappearing, reflection display, and dark display, respectively.

Figure 9:
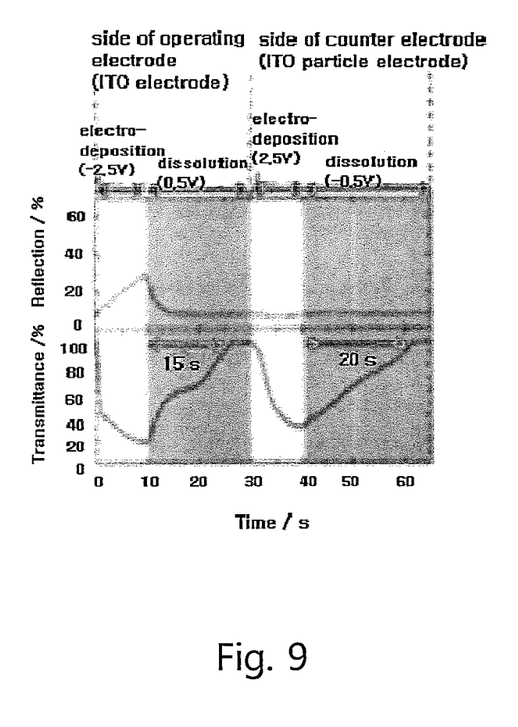
FIG. 9 is a drawing showing transmission ratio and reflection ratio when applied voltage is varied with respect to a display device according to one example of the present invention.
Figure 10:
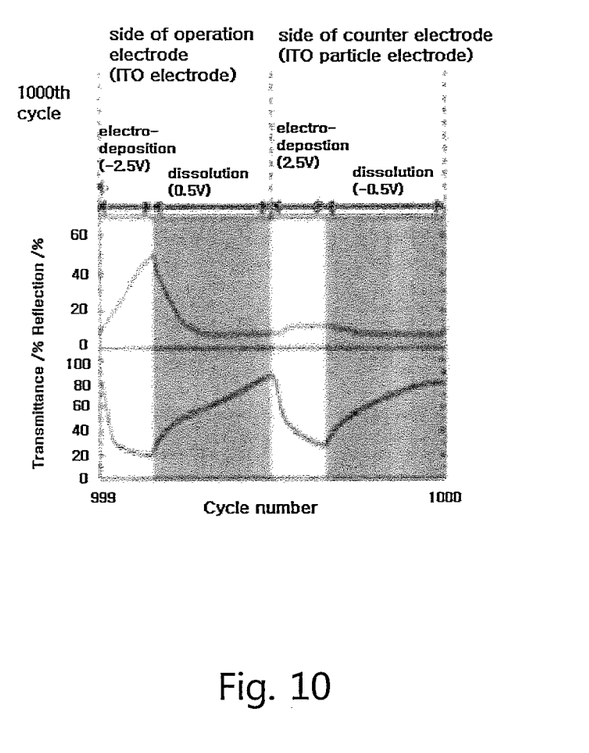
FIG. 10 is a drawing showing transmission ratio and reflection ratio when applied voltage is varied with respect to a display device according to one example of the present invention.

In FIG. 9, transmission ratio and reflection ratio for 700 nm were shown when −2.5 V was applied during 10 seconds, 0.5 V was applied during 20 seconds, 2.5 V was applied during 10 seconds, and −0.5 V was applied during 20 seconds, respectively. The following results in the side of ITO electrode were confirmed. When −2.5 V was applied, reflection ratio was increased and transmission ratio was decreased, thereby reflection state being obtained. When 0.5 V was applied, transmission ratio was increased and reflection ratio was decreased, thereby transmission state being obtained. When 2.5 V was applied, transmission ratio was decreased and reflection ratio was decreased, thereby dark state being obtained. When −0.5 V was applied, transmission ratio was increased and reflection ratio remained to be decreased, thereby transmission state being obtained. Furthermore, these states were maintained even though cycle of applying voltages was repeated one thousand times. In FIG. 10, these results were shown.

Figure 11:
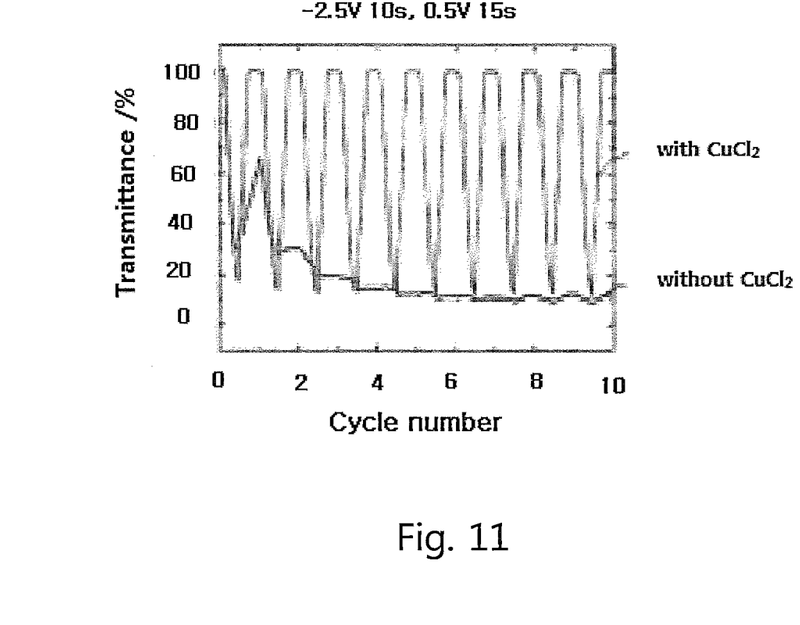
FIG. 11 is a drawing showing transmission ratio and reflection ratio when applied voltage is varied with respect to a display device according to one example of the present invention.
Figure 12:
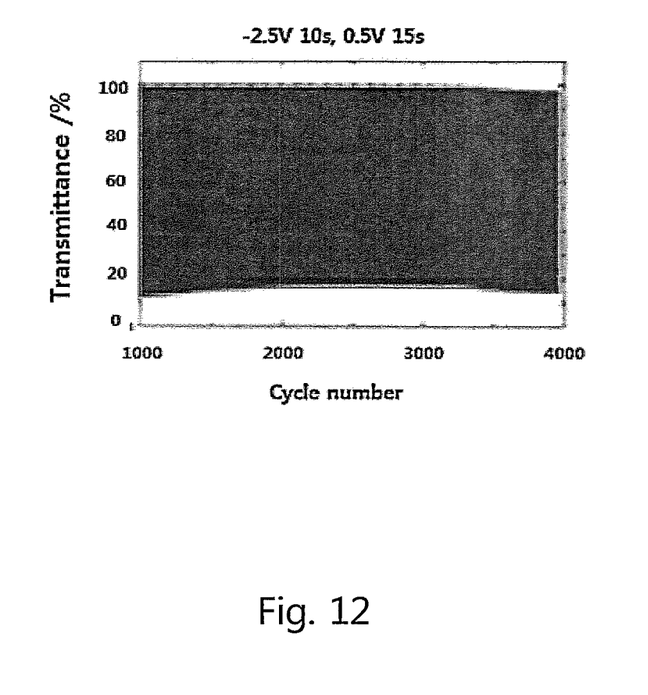
FIG. 12 is a drawing showing transmission ratio and reflection ratio when applied voltage is varied with respect to a display device according to one example of the present invention.

Property depending on repetitively applying voltages was confirmed again with respect to the element of the example. These results are shown in FIGS. 11 and 12. FIG. 11 shows transmission spectra for 700 nm when process of four thousand times of applying −2.5 V during 10 seconds and −0.5 V during 15 seconds was carried out. FIG. 12 shows an enlarged drawing when process of ten times thereof was carried out. As a comparative example, a comparative element similar to the element of the example was prepared and then measured by the same method, the comparative element having no $CuCl_2$ (see FIG. 12). Thus, it was confirmed that excellent durability for repetitive voltage applying was accomplished by including $CuCl_2$.

Hereinabove, based on the example, it was confirmed that a light-adjusting element including electrochromic material and having mirror surface display mode with high reflection ratio, and a product containing the same could be obtained.

INDUSTRIAL APPLICABILITY

The present invention is industrially applicable as a display device.

DESCRIPTION OF REFERENCE NUMERALS

1 display device
2, 3 substrate
4 electrolyte layer

What is claimed is:

1. A light-adjusting element comprising:
a pair of substrates;
a pair of electrodes formed on opposing surfaces of the pair of substrates, with one electrode being a transparent electrode that has depressions and protrusions of nanometer-scale order; and
an electrolyte layer including electrolyte, electrochromic material that contains silver, and a mediator, the electrolyte layer being sandwiched between the pair of electrodes.

2. The light-adjusting element according to claim 1, wherein the transparent electrode having depressions and protrusions of nanometer-scale order is a particle-modified transparent electrode with electrical conductivity.

3. The light-adjusting element according to claim 1, wherein the other electrode opposing the transparent electrode that has depressions and protrusions of nanometer-scale order is a smooth transparent electrode.

4. The light-adjusting element according to claim 1, wherein difference of maximum height and minimum height of the transparent electrode having depressions and protrusions is 100 nm or more and 500 nm or less.

5. The light-adjusting element according to claim 1, wherein the electrolyte includes a thickening agent.

6. A product at least partially including the light-adjusting element according to claim 1.

7. The light-adjusting element according to claim 1, wherein the mediator includes copper (II) ion.

8. The light-adjusting element according to claim 7, wherein molar concentration of the copper (II) ion of the mediator is 1 or more and 3 or less when molar concentration of silver ion of the electrochromic material is 10.

* * * * *